United States Patent
Chantal et al.

(10) Patent No.: US 6,939,104 B2
(45) Date of Patent: Sep. 6, 2005

(54) TURBINE BLADE WITH SEALING ELEMENT

(75) Inventors: Giot Chantal, Combs la Ville (FR); Jean-Luc Soupizon, Vaux le Penil (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/479,180

(22) PCT Filed: May 30, 2002

(86) PCT No.: PCT/FR02/01812
§ 371 (c)(1), (2), (4) Date: Mar. 29, 2004

(87) PCT Pub. No.: WO02/097241
PCT Pub. Date: Dec. 5, 2002

(65) Prior Publication Data
US 2004/0146404 A1 Jul. 29, 2004

(30) Foreign Application Priority Data
May 31, 2001 (FR) .............................. 01 07122

(51) Int. Cl.$^7$ .............................................. F01D 11/12
(52) U.S. Cl. ............................ 415/173.1; 415/173.4; 415/173.6; 416/191; 416/192
(58) Field of Search ......................... 415/173.1, 173.4, 415/173.5, 173.6; 416/188–192; 277/414, 415

(56) References Cited

U.S. PATENT DOCUMENTS

| | | | |
|---|---|---|---|
| 3,339,933 A | | 9/1967 | Foster |
| 3,545,882 A | | 12/1970 | Williamson |
| 4,576,551 A | * | 3/1986 | Olivier et al. .............. 416/191 |
| 4,957,411 A | * | 9/1990 | Girault .................... 415/173.4 |
| 5,154,581 A | * | 10/1992 | Borufka et al. ............. 416/190 |
| 6,402,474 B1 | * | 6/2002 | Okuno ....................... 416/190 |
| 2004/0012151 A1 | * | 1/2004 | Beeck et al. ................. 277/415 |

FOREIGN PATENT DOCUMENTS

| | | |
|---|---|---|
| DE | 100 40 431 | 4/2001 |
| EP | 0 287 371 | 10/1988 |
| FR | 1 330 657 | 6/1963 |
| FR | 2 615 254 | 11/1988 |
| SU | 792 014 | 12/1980 |
| WO | 02 25065 | 3/2002 |

* cited by examiner

*Primary Examiner*—Christopher Verdier
(74) *Attorney, Agent, or Firm*—Oblon, Spivak, McClelland, Maier & Neusadt, P.C.

(57) ABSTRACT

A turbine blade including a head at its peripherally outer end, and on the outside face thereof at least one wiper is formed having a first end portion and a second end portion, with a wiper tip extending between the two end portions. The first portion situated on the suction side of the blade is taller than the second end portion to form a sawtooth effect between the wipers of two adjacent blades mounted on a turbine rotor. The tip of each wiper presents a convex surface between the first portion and the second portion.

21 Claims, 3 Drawing Sheets

TURBINE BLADE WITH SEALING ELEMENT

The invention relates to a blade for a moving rotor stage of a turbine, the blade having a pressure side and a suction side disposed on either side of an axis of the blade, said blade further comprising a head situated at its peripherally outer end and at least one sealing wiper formed on said head, said sealing wiper being disposed transversely to the pressure and suction sides and presenting a first end portion at the suction side and a second end portion at the pressure side, said first end portion being taller than said second end portion, said wiper presenting a wiper tip between said first and second end portions.

The performance of turbomachines for use in aviation or in other kinds of industrial production is continuously being improved. For example, it is possible to increase the efficiency of a moving-blade turbine stage or compression stage by improving sealing between the rotor and the stator at the ends of the blades, and by ensuring that the moving and fixed parts match in operation.

Depending on engine operating conditions, certain vibratory instability phenomena of the moving blades can be observed. In particular, vibration can come from aerodynamic flow conditions at the tips of the blades.

Generally, clearance is left between the tips of the blades and the associated stator. In operation, friction between the blades and the shroud can lead to the appearance of variation in said clearance and to damage being done to the ends of the blades and/or to the surface of the shroud, for several reasons. Firstly the rotor and the shroud concentric therewith are not exactly circular in shape. Secondly there exist variations due to differential thermal expansion between the rotor and the shroud. Finally mechanical deformation arises from the stresses that are exerted on the moving parts of the rotor or on the stationary parts of the associated stator.

To reduce such friction, it is known to place sealing and wear linings made of "abradable" materials on the inside surfaces of the stator facing the moving blades. These surfaces are abradable, which means that they are coated in a material which wears away or becomes abraded as a function of the blades going past until it accommodates them. The blades are then provided with wipers at their peripheries, which wipers are designed to co-operate with the abradable linings. The wipers are in the form of shaped elements of abrasive material.

It is known to place the wipers in a sawtooth configuration from one blade to the next so as to prevent them from wearing. However, such wipers present rectilinear tips which lead to a large residual leakage section.

The object of the invention is to propose blades having wipers that enable said residual leakage section to be reduced, thereby making it possible to increase the efficiency of the turbine and thus to reduce the specific fuel consumption of the engine.

The invention achieves this object by the fact that said wiper tip presents a convex surface which extends continuously between said first and second end portions.

Since the tip of the wiper is convex, the available section between the tip and the surface of the shroud is reduced.

Advantageously, the convex surface presents a circular cross-section having a middle axis, a center, and a radius.

To make the wipers easier to produce, it is advantageous to select a circular arc as the shape for the tip.

Advantageously, the middle axis is offset from the blade axis by an angle which is oriented from the pressure side towards the suction side, and the center is offset by a distance measured perpendicularly to the blade axis.

The first end portion is of greater height than the second end portion so as to retain the sawtooth effect between two consecutive blades. As a result, it is necessary to orient the curvature of the circular arc if it is desired to interconnect the two end portions so as to have a single, unique curvilinear surface.

Advantageously, the distance is not less than half of one pitch step corresponding to half the spacing between said first end portion and said second end portion.

In order to have wiper clearance to avoid wear, it is preferable to offset the center of curvature of the tip by half a step relative to the axis of the blade.

Advantageously, the difference in height between said first end portion and said second end portion is at least 0.2 millimeters (mm).

This difference in height enables the sawtooth effect to be conserved between two consecutive blades.

Advantageously, the blade has two wipers that are substantially parallel in such a manner as to create a baffle for the air which flows between the blades and the shroud, thus enabling vibratory instability to be reduced.

Other characteristics and advantages of the invention appear on reading the following description made by way of non-limiting example and with reference to the accompanying drawings, in which.

Figure 1:
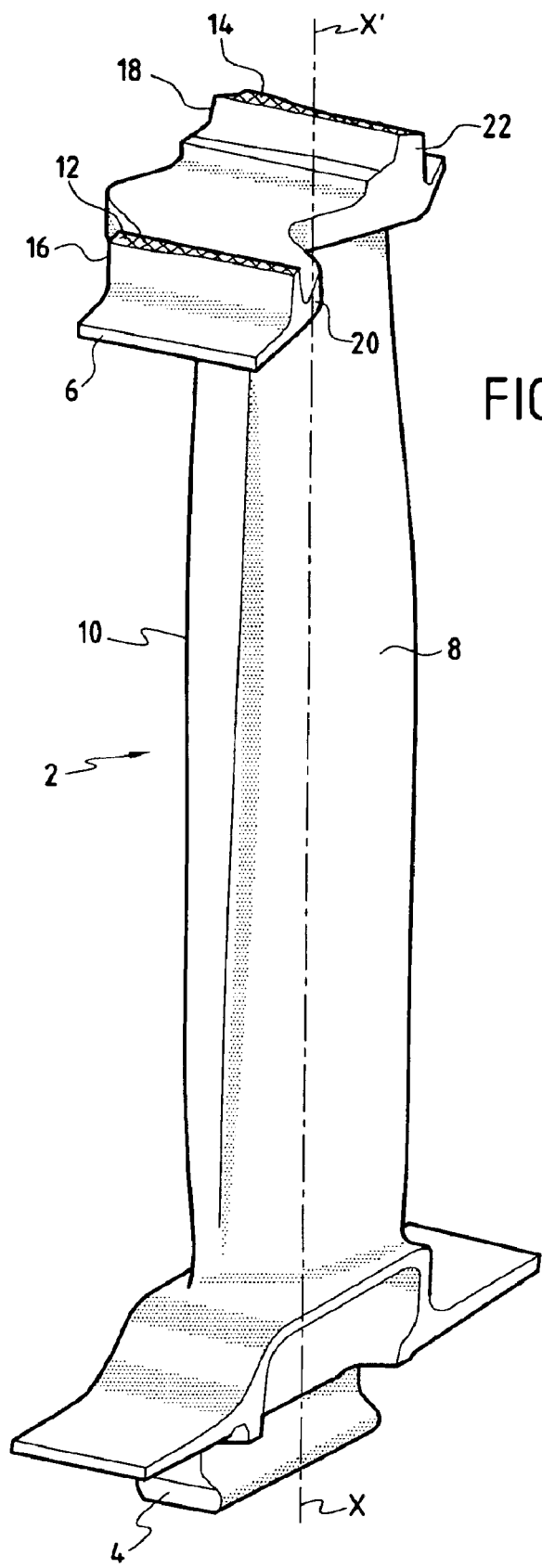
FIG. 1 is a perspective view of a turbine blade having two wipers.

FIG. 1 shows a blade 2 of a turbomachine which comprises a blade root 4 at its inner end and a head 6 at its outer peripheral end. To encourage axial flow, the blade 2 extends along a blade axis X–X' perpendicular to the axis of the rotor on which said blade 2 is mounted, having a profile with a pressure side 8 and a suction side 10. Two wipers 12 and 14 are formed on the outer face of the head 6.

Figure 2:
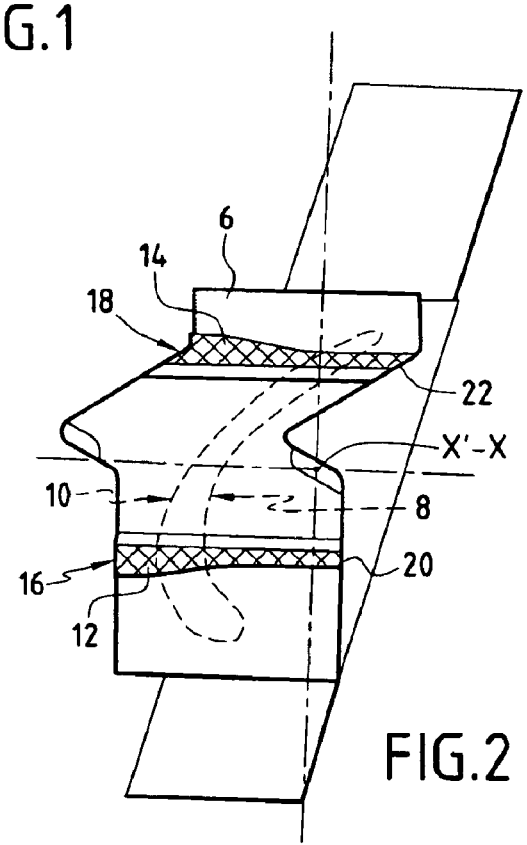
FIG. 2 is a plan view of FIG. 1.

FIGS. 1 and 2 show that the wipers 12 and 14 are disposed transversely relative to the pressure and suction sides 8 and 10. Each of the wipers 12 and 14 has a respective first end portion 16, 18 situated on the suction side 10 and a respective second end portion 20, 22 situated on the pressure side 8.

Figure 3:
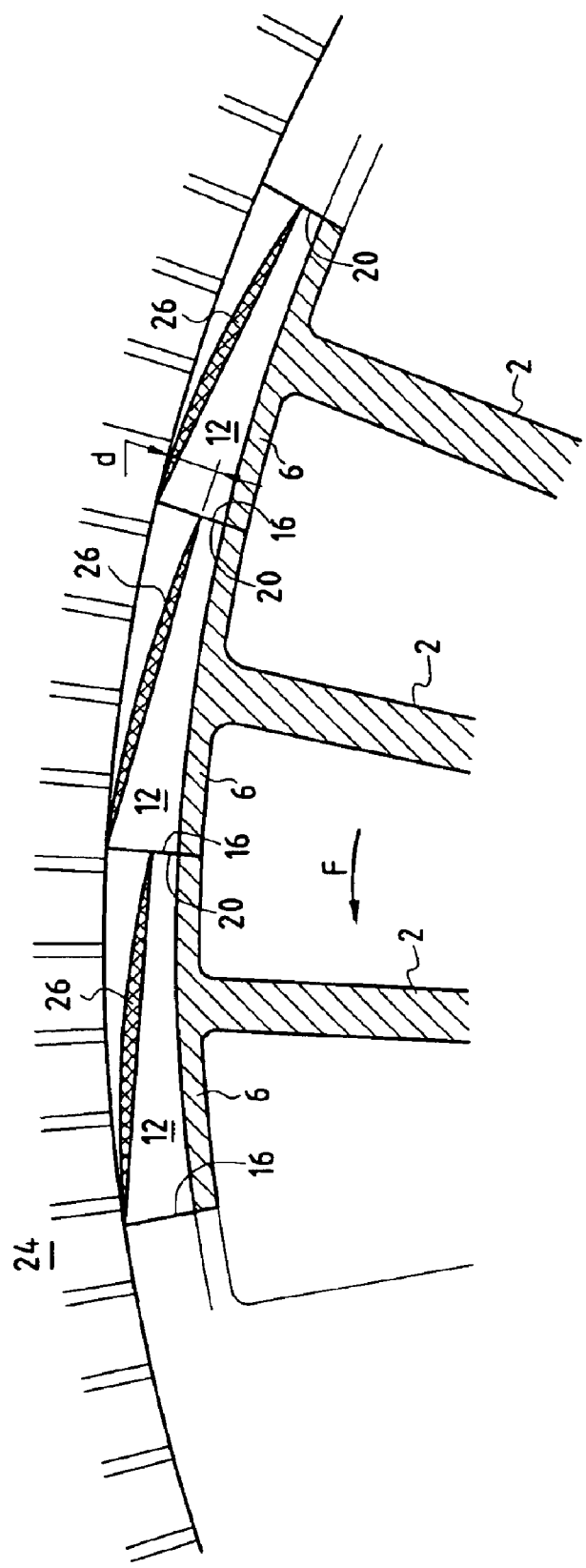
FIG. 3 is a cross-section view showing a plurality of blades mounted on a rotor disposed inside a shroud.
Figure 4:
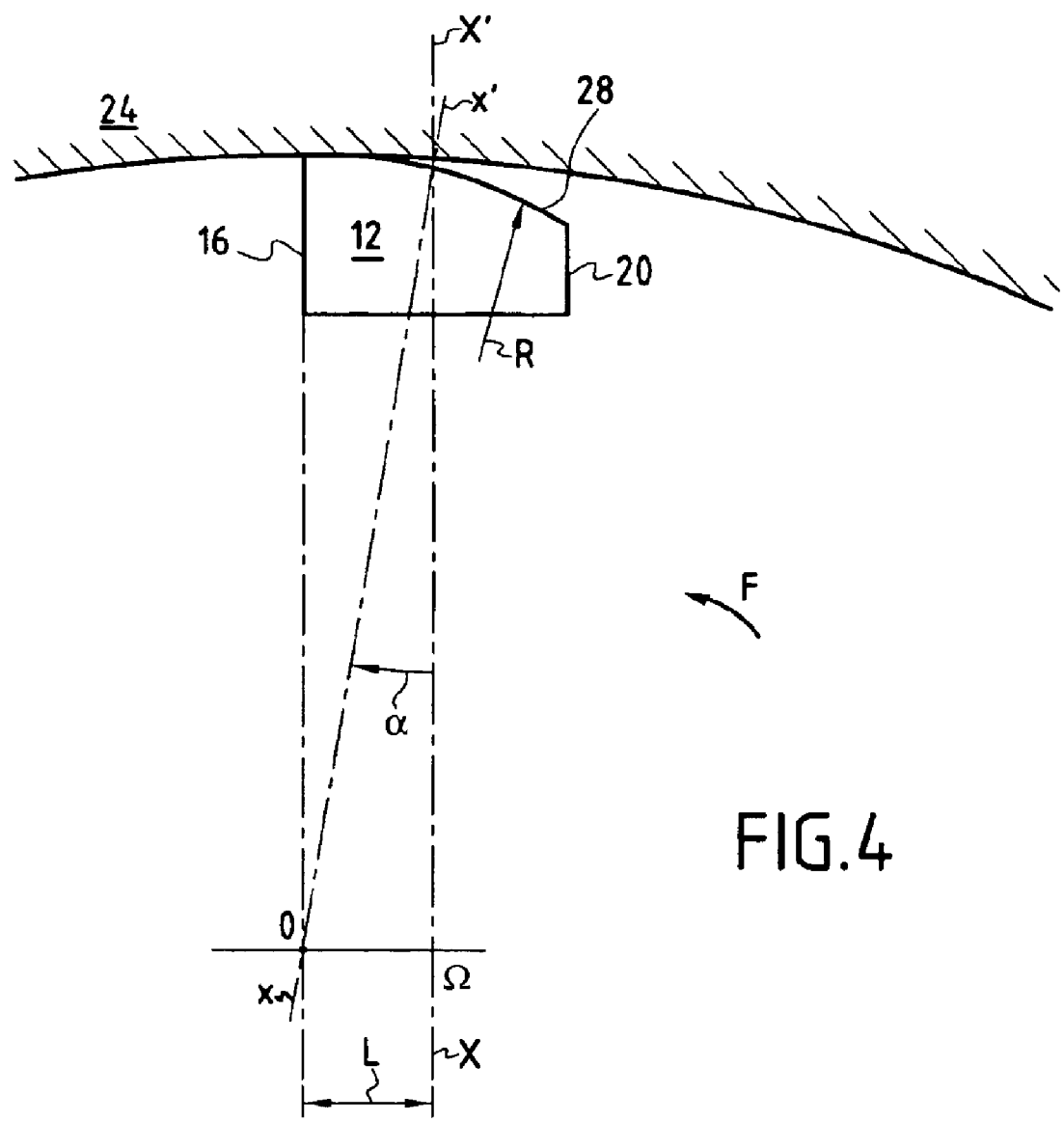
FIG. 4 is a simplified view showing a blade in contact with the shroud.

FIG. 3 shows a plurality of blades 2 mounted on a rotor (not shown) placed in a stator 24 and having a direction of rotation as indicated by an arrow F. The blades all carry wipers 12 and 14. The wipers 12 and 14 are disposed in parallel planes perpendicular to the axis of rotation of the rotor and they extend peripherally over an angle equal to one angular step of the inter-blade pitch so as to form a baffle with the inside wall of the stator 24. Only the wipers 12 can be seen in FIG. 3.

The first end portion 16 is taller than the second end portion 20 so as to form a sawtooth effect on going from a wiper 12 formed on a first blade 2 to the wiper 12 formed on the following blade 2. The difference in height d is preferably selected to be equal to 0.2 mm in order to avoid wear of the wiper 12.

The stator 24 has an abradable material on its inside wall thus making it possible in operation for the stator to be abraded and thus adapt to the shape of the wipers 12 and 14 rubbing thereagainst. Thus, friction is reduced after the surfaces have become matched to each other, thereby enabling leaks to be reduced.

In order to diminish residual leaks between the tips 26 of the wipers 12 and 14 and the stator 24, the tips 26 present a surface that is convex in the circumferential direction. The shaded portions in FIG. 3 show the reduction in the leakage area compared with the prior art.

In particular, the section of the tip 26 is in the form of a circular arc 28 of center O and radius R. The first end portion 16 is connected to the second end portion 20 via the tip 26 whose circular arc 28 is inclined since the two end portions 16 and 20 are at different heights. Thus, the center O of the circular arc 28 is offset by a distance L relative to the center of rotation Ω of the blades when they are mounted on the rotor 24. The distance L is not less than half the length of the wiper, which corresponds to half a pitch step, i.e. to half the spacing of two consecutive blades 2.

The middle axle x–x' of the wiper is offset by an angle α that is oriented towards the suction side 10 relative to the axis of the blade X–X'. The orientation of the angle α is thus opposite to the direction of rotation of the rotor 24 as indicated by arrow F. The radius of curvature R of the circular arc 28 may be equal to or less than the radius of curvature of the shroud.

What is claimed is:

1. A blade for a turbine, the blade having a pressure side and a suction side disposed on either side of an axis of the blade, the blade comprising:
    a head situated at a peripherally outer end of the blade; and
    at least one sealing wiper formed on the head, said sealing wiper disposed transversely to the pressure and suction sides and presenting a first end portion at the suction side and a second end portion at the pressure side, said first end portion being taller than said second end portion, said sealing wiper presenting a wiper tip between said first and second end portions,
    wherein the wiper tip presents a convex surface that extends between said first and second end portions.

2. A blade according to claim 1, wherein said convex surface presents a circular cross-section having a middle axis, a center, and a radius.

3. A blade according to claim 2, wherein said middle axis is offset from the blade axis by an angle oriented from the pressure side towards the suction side, and wherein the center is offset by a distance measured perpendicularly to the blade axis.

4. A blade according to claim 3, wherein the distance is not less than half of one pitch step corresponding to half a spacing between said first end portion and said second end portion.

5. A blade according to claim 1, wherein a difference in height between said first end portion and said second end portion is at least 0.2 mm.

6. A blade according to claim 1, wherein the blade carries two wipers.

7. A blade according to claim 6, wherein the two wipers are substantially parallel.

8. A blade according to claim 6, wherein said two wipers are disposed in parallel planes perpendicular to an axis of rotation of the blade.

9. A blade according to claim 1, wherein said convex surface extends continuously from said first end portion to said second end portion.

10. A blade for a turbine, said blade having a pressure side and a suction side, said blade comprising:
    at least one wiper with a first end portion at the suction side and a second end portion at the pressure side, said first end portion being higher than said second end portion, said wiper having a wiper tip between said first and second end portions,
    wherein the wiper tip has a convex surface that extends between said first and second end portions.

11. A blade according to claim 10, wherein said wiper is disposed transversely relative to the pressure and suction sides.

12. A turbine comprising:
    a stator;
    a rotor in said stator, said rotor comprising a plurality of blades, each blade being configured according to claim 11.

13. A blade according to claim 11, wherein said convex surface presents a circular cross-section having a middle axis, a center, and a radius.

14. A blade according to claim 13, wherein said middle axis is offset from a blade axis by an angle oriented from the pressure side towards the suction side, and wherein the center is offset by a distance measured perpendicularly to the blade axis.

15. A blade according to claim 14, wherein the distance is not less than half of one pitch step corresponding to half a spacing between said first end portion and said second end portion.

16. A blade according to claim 11, wherein a difference in height between said first end portion and said second end portion is at least 0.2 mm.

17. A turbine according to claim 12, wherein each blade carries two wipers.

18. A turbine according to claim 17, wherein the two wipers are substantially parallel.

19. A turbine according to claim 18, wherein said two wipers are disposed in parallel planes perpendicular to an axis of rotation of the rotor.

20. A turbine according to claim 17, wherein said two wipers are disposed to form a baffle with an inside wall of said stator.

21. A blade according to claim 11, wherein said convex surface extends continuously from said first end portion to said second end portion.

* * * * *